United States Patent [19]

Marquette et al.

[11] 4,183,379
[45] Jan. 15, 1980

[54] DUCT BOARD ASSEMBLY

[75] Inventors: Ralph L. Marquette; James E. Jones, both of Indianapolis, Ind.

[73] Assignee: Mutz Corp., Indianapolis, Ind.

[21] Appl. No.: 791,509

[22] Filed: Apr. 27, 1977

Related U.S. Application Data

[63] Continuation of Ser. No. 637,292, Dec. 3, 1975, abandoned.

[51] Int. Cl.² ............................................. F16L 59/14
[52] U.S. Cl. ................................. 138/158; 138/149; 138/161
[58] Field of Search ............... 138/149, 156, 158, 161

[56] References Cited

U.S. PATENT DOCUMENTS

| | | | |
|---|---|---|---|
| 1,297,591 | 3/1919 | Prescott | 138/168 X |
| 1,734,209 | 11/1929 | Huffine | 138/149 |
| 2,389,468 | 11/1945 | Terry | 138/158 |
| 2,627,430 | 2/1953 | Koffler | 138/168 X |
| 2,634,760 | 4/1953 | Williams | 138/168 |
| 2,916,054 | 12/1959 | Callan | 138/157 X |
| 3,092,529 | 6/1963 | Pearson | 138/149 |
| 3,251,382 | 5/1966 | Tatsch | 138/157 X |
| 3,422,525 | 1/1969 | Jeppsson | 138/136 X |
| 3,614,967 | 10/1971 | Royston | 138/149 X |
| 3,682,163 | 8/1972 | Plummer | 138/168 |
| 3,925,856 | 12/1975 | Plummer | 138/168 X |
| 3,941,159 | 3/1976 | Toll | 138/156 |

FOREIGN PATENT DOCUMENTS 377601 6/1964 Switzerland .............................. 138/149

*Primary Examiner*—Richard E. Aegerter
*Assistant Examiner*—James E. Bryant, III
*Attorney, Agent, or Firm*—Hume, Clement, Brinks, William & Olds, Ltd.

[57] ABSTRACT

Disclosed is a duct board assembly which comprised a panel of conventional duct board formed of rigid thermal insulation to which is attached boardering strips on one face of the panel; the panel may be provided with spaced, longitudinal grooves to define the wall widths of an air duct section to be formed from the duct board assembly and the outer margins of said panel-framing strips being provided with locking means to provide a closed longitudinal seam for the air duct section and to provide for closed joining, end-to-end, of successive duct sections.

5 Claims, 8 Drawing Figures

U.S. Patent   Jan. 15, 1980   Sheet 1 of 2   4,183,379
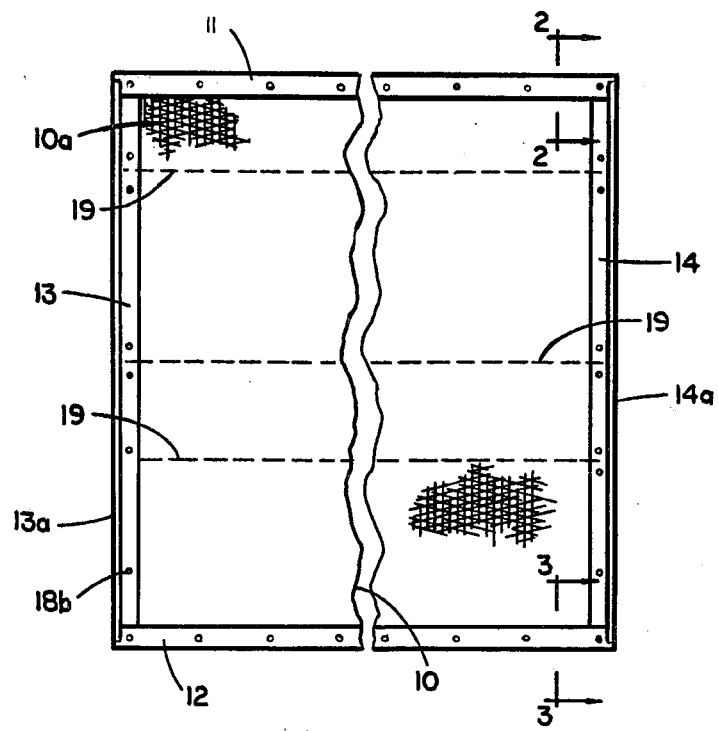
Fig. 1
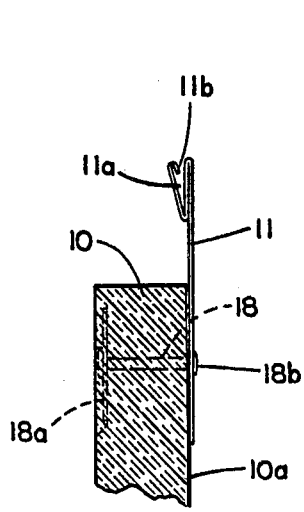
Fig. 2
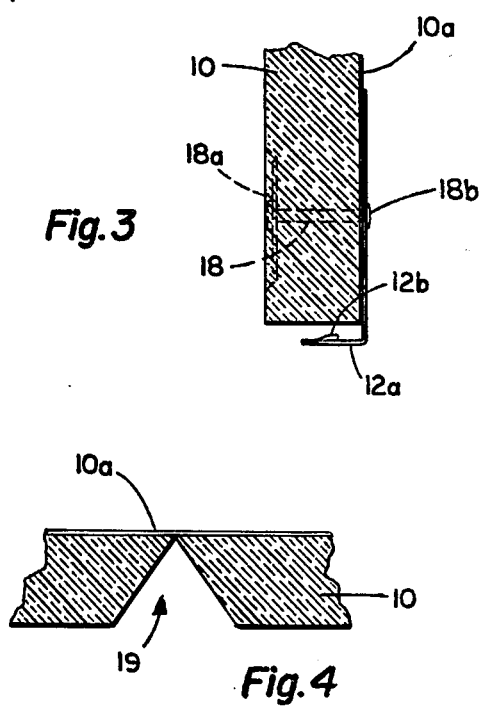
Fig. 3
Fig. 4

DUCT BOARD ASSEMBLY

This is a continuation of U.S. application, Ser. No. 637,292 filed on Dec. 3, 1975 now abandoned by the same inventors named herein.

BACKGROUND OF THE INVENTION

For several years it has been common practice to form air distribution ducts from panels of self-supporting rigid thermal insulation of the mineral fiber type. These panels may be formed by, for example, a four by eight foot sheet of insulating material to one surface of which is adhered a kraft paper layer on which has been deposited a thin layer of aluminum. The metal foil outer surface thus provided may be reinforced by an imbedded netting of cords or "skrim". Heretofore these panels of duct wall have been grooved longitudinally at the job site and the duct section formed by folding the panel into a tube with the longitudinal seam being established and sealed by adhesive, preferably metallic tape running the length of the duct section. In such application the tape eventually dries out and peels from the duct wall and maintaining a sealed seam in the duct is difficult.

The concept of the present invention involves modifying conventional duct board panels by adding to it metal framing strips, on which suitable locking or joining configurations have been preformed. By proper scoring or grooving of the modified sheets they may be conveniently formed into the desired duct work configuration at the installation site but may be transported to the site in flat, unformed condition. The metal framing strips applied to the panels add to its rigidity and strength in transport and after assembly. The longitudinal locking seam, made possible by the presence of the adjacent metal framing strips when the panel has been formed into a duct section, makes the use of sealing tape unnecessary along the longitudinal seam and at the junction between duct sections. Labor saving in the installation of the duct wall board of the present invention over conventional assembly methods is substantial. While described herein with respect to forming of rectangular duct sections it will be understood that the panels of the present invention might also be used to form various air distribution fittings such as duct angles, elbows, reducers and the like.

BRIEF DESCRIPTION OF THE DRAWINGS

FIG. 1 is a front view of a duct wall panel embodying the present invention.

FIG. 2 is a fragmentary, enlarged sectional view taken generally along the line 2—2 of FIG. 1.

FIG. 3 is an enlarged sectional view taken generally along the line 3—3 of FIG. 1.

FIG. 4 is an enlarged sectional view illustrating the longitudinal grooves formed in the insulating board component of the panel.

DESCRIPTION OF THE PREFERRED EMBODIMENT

Figure 5:
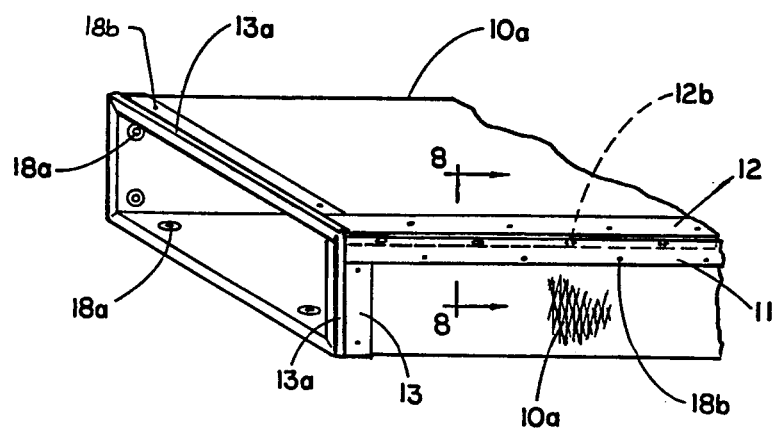
FIG. 5 is a perspective, fragmentary view of a rectangular duct formed from the panel of FIG. 3.

Referring initially to FIG. 1, the duct wall assembly of the present invention is composed of a central sheet of insulating material 10 of rigid, self-supporting thermal insulation which is made of a mineral fiber type. The insulation is covered on one surface by a layer of kraft paper which is adhered to the insulation. The paper has a thin metal foil covering 10a and a network of reinforcing cords or "skrim" may be provided in the paper. These sheets of foil surfaced insulation are well known in the art and commercially available in variously sized panels.

Secured to the outer marginal portions of the duct wall are metal framing members, the framing members for the longitudinal margins of the sheet being indicated at 11 and 12 and the framing members for the transverse margins of the sheet being indicated at 13 and 14. As used herein, the term longitudinal margins may include both the longitudinal edges of material 10 as well as the outer marginal portions adjacent the longitudinal edges on the front and rear faces of material 10. The metal framing members may be formed of galvanized metal and prior to their attachment to the foil covered surface of the insulating material 10, the metal strips forming the framing members are provided with locking means. As may be seen in FIG. 2 the strip 11 is bent upon itself to form a slip lock configuration with a bight area 11a and a inwardly extending locking tab 11b. The strips 11, 12, 13 and 14 are attached to the insulation board by means of conventional fasteners 18, carrying enlarged heads 18a. The fasteners extend through the insulation material and its overlying foil covering and the tip of the fastener is secured to the overlying strip by any suitable means such as spot-welding as indicated at 18b in FIG. 2. It will be understood that the locking configuration formed on the outer margin of the strips is completed prior to securing the strips to the insulation board.

As may be seen in FIG. 3, the longitudinal metal strip 12 is bent inwardly along its outer margin to form the extending flange 12a and, spaced along the flange, there are provided protrusions 12b which extend from the surface of the flange. As shown in FIG. 4, the insulation board may be grooved or scored as indicated at 19 along longitudinal lines paralleling the longitudinal margins of the sheet. This grooving is indicated by broken lines in FIG. 1. The longitudinal grooves define the width of the duct walls and establish the lines along which the sheet is to be bent in forming the rectangular duct of FIG. 5 as will subsequently be explained.

Figure 6:
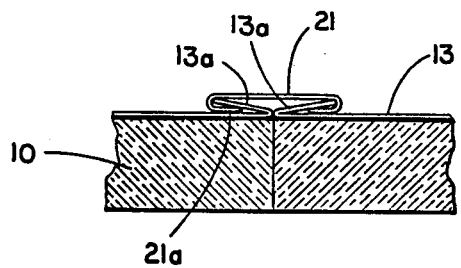
FIG. 6 is a fragmentary sectional view illustrating the locking means which may be used to secure adjacent duct sections together.
Figure 8:
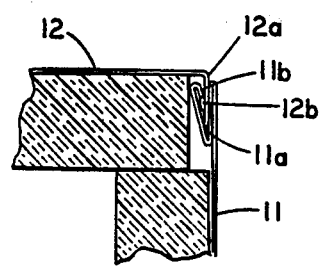
FIG. 8 is an enlarged sectional view taken generally along the line 8—8 of FIG. 5 and illustrating the locking means forming the longitudinal seam on the duct.

The transverse metal strips 13 and 14 are each provided with locking means which takes the form of an outward, turned-back flange 13a and 14a respectively, the flange being visible in both FIG. 1 and FIG. 6. A rectangular duct section is formed from the panel of FIG. 1 by bending the panel along the lines 19 at 90° bringing the longitudinal strips 11 and 12 together as shown in FIG. 5. As the strips 11 and 12 are brought together the flange 12a on the strip 12 is inserted into the bight area 11a formed at the outer margin of the strip 11. When the flange 12a is inserted to the proper depth the locking tab 11b will snap behind the spaced protrusions 12b carried by the flange 12a as shown in FIG. 8. The adjoining margins of the metal members 11 and 12 will then be securely locked together and the slight compression of the insulating material underlying the strips 11 and 12 will provide a sealed, secured joint which requires no additional taping.

Figure 7:
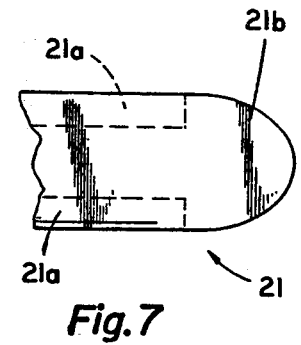
FIG. 7 is a fragmentary, top plan view of the locking strip shown in FIG. 6.

The duct section shown in FIG. 5, formed from the panel of FIG. 1, may be joined to similar duct sections, end-to-end as shown in FIG. 6. The return bends 13a on the transverse framing strips 13 of two sections receive a drive cleat 21 as shown in FIG. 6, the cleat being shown fragmentarily also in FIG. 7. The cleat is formed by turning inwardly two marginal areas 21a, these turned-back portions being received in the bight of the portions 13a. A flat tab 21b is formed at each end of the cleat and this may be bent inwardly to lock the cleat in place overlying the junction of the two adjacent duct sections. The use of a drive cleat, as illustrated, serves to draw the abutting margins of the insulating material tightly together thereby obviating the use of sealing tape, however, it will be understood that other forms of locking means might be utilized to secure together adjacent duct sections.

While the invention has been disclosed and described in some detail in the drawings and foregoing description, they are to be considered as illustrative and not restrictive in character, as other modifications within the scope of the invention may readily suggest themselves to persons skilled in the art.

We claim:

1. An article of manufacture of substantially flat configuration from which a thermally-insulated air duct section is formed, comprising:

a sheet of thermally-insulating material, having an inside face, an outside face, a pair of longitudinal margins comprised of flexible fibers, and a pair of transverse margins:

flange means mounted at one of said longitudinal margins;

gripping means, mounted at the other one of said longitudinal margins, adapted to attachingly interconnect with said flange means upon bringing said longitudinal margins into compressed, abutting relationship so that said fibers comprising one of said longitudinal margins contact said fibers comprising the other one of said longitudinal margins continuously along the seam defined by the confluence of said longitudinal margins;

means defining a plurality of longitudinal grooves in the inside face of said article for folding said article to form said air duct sections; and frame strips, mounted on the outside face of said article at said transverse margins, compising bendable portions and extending parallel with said grooves, and rigidifying portions interconnecting said bendable portions to rigidify said article, whereby a rigid, thermally-insulated air duct section is formed entirely from said article of manufacture as it exists in its substantially flat configuration.

2. An article of manufacture of substantially flat configuration from which a thermally-insulated air duct section is formed, comprising:

a sheet of thermally-insulating material, having an inside face, an outside face, a pair of longitudinal margins comprised of flexible fibers, and a pair of transverse margins;

flange means mounted at one of said longitudinal margins;

gripping means, mounted at the other one of said longitudinal margins, adapted to attachingly interconnect with said flange means upon bringing said longitudinal margins into compressed, abutting relationship so that said fibers comprising one of said longitudinal margins contact said fibers comprising the other one of said longitudinal margins continuously along the seam defined by the confluence of said longitudinal margins;

means defining a plurality of longitudinal grooves in the inside face of said article for folding said article to form said air duct section;

frame strips, mounted on the outside face of said article at said transverse margins, comprising bendable portions and extending parallel with said grooves and rigidifying portions interconnecting said bendable portions to rigidify said article; and locking means, mounted adjacent said transverse margins for permitting a rigid, substantially thermally-insulated connection between said air duct section formed entirely from said article of manufacture as it exists in its substantially flat configuration, and another substantially identical air duct section so formed.

3. The article defined in claim 2 wherein said locking means include framing strip means secured to said transverse margins of said article of manufacture having a turned-back flange defining a bight area, and wherein said article includes cleat means having a turned-back portion adapted to engage said turned-back flange at said bight area to rigidly connect said cleat means to said locking means.

4. The article defined in claim 3 further including fastening means extending through said sheet for securing said framing strip thereto.

5. The article defined in claim 3 wherein said cleat means have a rigid tab extending beyond a corner of said air duct section defined by the confluence of said longitudinal margins; said tab being adapted to be bent around said corner to provide rigidity to said air duct section.

* * * * *

UNITED STATES PATENT AND TRADEMARK OFFICE
CERTIFICATE OF CORRECTION

PATENT NO. : 4,183,379
DATED : January 15, 1980
INVENTOR(S) : Ralph L. Marquette, et. al.

It is certified that error appears in the above-identified patent and that said Letters Patent are hereby corrected as shown below:

Column 3, line 33, delete ":" and insert therefor --;--

Column 3, line 50, delete "and"

Column 4, line 26, delete "and"

Signed and Sealed this

Tenth Day of June 1980

[SEAL]

Attest:

SIDNEY A. DIAMOND

Attesting Officer     Commissioner of Patents and Trademarks